US012327521B2

(12) United States Patent
Long et al.

(10) Patent No.: US 12,327,521 B2
(45) Date of Patent: Jun. 10, 2025

(54) DRIVE CIRCUIT, DRIVING METHOD THEREFOR, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Yue Long, Beijing (CN); Yao Huang, Beijing (CN); Yuanjie Xu, Beijing (CN); Benlian Wang, Beijing (CN); Lili Du, Beijing (CN)

(73) Assignees: Chengdu BOE Optoelectronics Technology Co., Ltd., Sichuan (CN); BOE Technology Grouup Co., Ltd., Beijing (CN)

( * ) Notice: Subject to any disclaimer, the term of this patent is extended or adjusted under 35 U.S.C. 154(b) by 0 days.

(21) Appl. No.: 18/034,534

(22) PCT Filed: Nov. 30, 2020

(86) PCT No.: PCT/CN2020/132988
§ 371 (c)(1),
(2) Date: Apr. 28, 2023

(87) PCT Pub. No.: WO2022/110247
PCT Pub. Date: Jun. 2, 2022

(65) Prior Publication Data

US 2023/0395024 A1 Dec. 7, 2023

(51) Int. Cl.
*G09G 3/3233* (2016.01)

(52) U.S. Cl.
CPC ... *G09G 3/3233* (2013.01); *G09G 2300/0842* (2013.01); *G09G 2310/0278* (2013.01)

(58) Field of Classification Search
CPC ......... G09G 3/3233; G09G 2300/0842; G09G 2310/0278; G09G 2300/0819;
(Continued)

(56) References Cited

U.S. PATENT DOCUMENTS

2012/0001893 A1 1/2012 Jeong et al.
2012/0139961 A1 6/2012 Choi
(Continued)

FOREIGN PATENT DOCUMENTS

CN 102314829 A 1/2012
CN 102411917 A 4/2012
(Continued)

OTHER PUBLICATIONS

CN202080003130.4 first office action.
PCT/CN2020/132988 international search report.

*Primary Examiner* — Chanh D Nguyen
*Assistant Examiner* — Nguyen H Truong
(74) *Attorney, Agent, or Firm* — IPro, PLLC

(57) ABSTRACT

A drive circuit, a driving method therefor, and a display device. The drive circuit comprises: an initialization circuit (10) configured to provide a signal of an initialization signal terminal (VINIT) to a gate of a driving transistor (M0) in response to a control signal; a first control circuit (20) configured to input the control signal to the initialization circuit (10) according to a signal of a first control terminal (VC1) and a signal of a second control terminal (VC2); a data writing circuit (30) configured to provide a signal of a data signal terminal (DA) to the driving transistor (M0) in response to a signal of a first scanning signal terminal (GA1); the driving transistor (M0) configured to generate a driving current according to the signal of the data signal terminal (DA); and a light-emitting device (L) configured to emit light under the control of the driving current.

20 Claims, 9 Drawing Sheets

(58) Field of Classification Search

CPC ... G09G 2300/0861; G09G 2310/0251; G09G 2310/0262; G09G 2310/08; G09G 2320/0233; G09G 2320/045; G09G 3/20; G09G 3/30; G09G 3/32; G09G 3/34; G09G 3/3266; G09G 3/3258; G09G 3/3275; G09G 3/3225; G09G 3/3291; G09G 3/3208; H01L 25/075; H01L 27/15; H01L 27/32; H01L 29/66; H01L 29/786; H01L 33/38; H01L 33/62; H01L 51/00; H01L 51/52

USPC .......................................................... 345/204

See application file for complete search history.

(56) References Cited

U.S. PATENT DOCUMENTS

| | | | | |
|---|---|---|---|---|
| 2016/0372036 | A1 | 12/2016 | Qing | |
| 2017/0201293 | A1* | 7/2017 | Zhang | H04H 20/12 |
| 2017/0256202 | A1* | 9/2017 | Sun | G09G 3/3233 |
| 2017/0263187 | A1* | 9/2017 | Zhu | G09G 3/3233 |
| 2017/0278457 | A1 | 9/2017 | Zhu et al. | |
| 2018/0166025 | A1* | 6/2018 | Zhou | G09G 3/3233 |
| 2018/0308427 | A1 | 10/2018 | Zhang et al. | |
| 2019/0096327 | A1* | 3/2019 | Peng | G09G 3/3241 |
| 2019/0114960 | A1* | 4/2019 | Lee | G09G 3/3225 |
| 2019/0130830 | A1* | 5/2019 | Han | G09G 3/3241 |
| 2020/0082757 | A1 | 3/2020 | Yuan et al. | |
| 2020/0135114 | A1 | 4/2020 | Lee et al. | |
| 2020/0211464 | A1* | 7/2020 | Yue | G09G 3/3266 |
| 2020/0234633 | A1* | 7/2020 | Wang | G09G 3/325 |
| 2020/0342812 | A1 | 10/2020 | Xu | |
| 2021/0110759 | A1* | 4/2021 | Qin | G09G 3/3233 |
| 2021/0233461 | A1 | 7/2021 | Yue et al. | |
| 2021/0256911 | A1* | 8/2021 | Lee | G09G 3/3258 |
| 2023/0206832 | A1 | 6/2023 | Gao et al. | |

FOREIGN PATENT DOCUMENTS

| | | | |
|---|---|---|---|
| CN | 103050080 | A | 4/2013 |
| CN | 104778917 | A | 7/2015 |
| CN | 105355170 | A | 2/2016 |
| CN | 106128360 | A | 11/2016 |
| CN | 205810345 | U | 12/2016 |
| CN | 106448554 | A | 2/2017 |
| CN | 106935198 | A | 7/2017 |
| CN | 106952615 | A | 7/2017 |
| CN | 107068060 | A | 8/2017 |
| CN | 107452338 | A | 12/2017 |
| CN | 108470539 | A | 8/2018 |
| CN | 109119027 | A | 1/2019 |
| CN | 109509427 | A | 3/2019 |
| CN | 109859682 | A | 6/2019 |
| JP | 2004361518 | A | 12/2004 |
| KR | 20120062252 | A | 6/2012 |

* cited by examiner

DRIVE CIRCUIT, DRIVING METHOD THEREFOR, AND DISPLAY DEVICE

The present application is a National Stage of International Application No. PCT/CN2020/132988, filed on Nov. 30, 2020, which is hereby incorporated by reference in its entirety.

FIELD

The present disclosure relates to the technical field of display, and in particular to a driving circuit and a driving method therefor, and a display device.

BACKGROUND

Featuring self-luminescence, low energy consumption, etc., electroluminescent diodes such as organic light emitting diodes (OLEDs), quantum dot light emitting diodes (QLEDs), and micro light emitting diodes (Micro LEDs) have currently become a focus in the field of application and research of electroluminescent display devices. In the conventional electroluminescent display device, an electroluminescent diode is driven by a driving circuit to emit light. However, the brightness of the electroluminescent diode can be adjusted only within a certain range, which is tied to a manufacturing process.

SUMMARY

An embodiment of the present disclosure provides a driving circuit. The driving circuit includes: an initialization circuit configured to provide a signal of an initialization signal terminal to a gate of a driving transistor in response to a control signal; a first control circuit configured to input the control signal into the initialization circuit according to a signal of a first control terminal and a signal of a second control terminal; a data writing circuit configured to provide a signal of a data signal terminal to the driving transistor in response to a signal of a first scanning signal terminal; the driving transistor configured to generate a driving current according to the signal of the data signal terminal; and a light emitting device configured to emit light under a control of the driving current.

In some examples, the first control circuit includes: a first transistor; and a gate of the first transistor is electrically connected to the first control terminal, a first electrode of the first transistor is electrically connected to the second control terminal, and a second electrode of the first transistor is electrically connected to the initialization circuit.

In some examples, the first control circuit further includes: a voltage stabilization capacitor; and a first electrode plate of the voltage stabilization capacitor is electrically connected to the second electrode of the first transistor, and a second electrode plate of the voltage stabilization capacitor is electrically connected to a reference signal terminal; or a first electrode plate of the voltage stabilization capacitor is electrically connected to the second electrode of the first transistor, and a second electrode plate of the voltage stabilization capacitor is electrically connected to the gate of the driving transistor.

In some examples, the reference signal terminal and one of the initialization signal terminal and a first power supply terminal are set as one signal terminal.

In some examples, the initialization circuit includes: a second transistor; and a gate of the second transistor is electrically connected to the first control circuit, a first electrode of the second transistor is electrically connected to the initialization signal terminal, and a second electrode of the second transistor is electrically connected to the gate of the driving transistor.

In some examples, the data writing circuit includes: a third transistor; and a gate of the third transistor is electrically connected to the first scanning signal terminal, a first electrode of the third transistor is electrically connected to the data signal terminal, and a second electrode of the third transistor is electrically connected to a first electrode of the driving transistor.

In some examples, the driving circuit further includes: a second control circuit, a third control circuit, and a fourth control circuit, where a first electrode of the driving transistor is electrically connected to a first power supply terminal through the third control circuit, and a second electrode of the driving transistor is electrically connected to the light emitting device through the fourth control circuit; the second control circuit is configured to conduct the gate of the driving transistor with the first electrode of the driving transistor in response to a signal of a second scanning signal terminal; the third control circuit is configured to conduct the first electrode of the driving transistor with the first power supply terminal in response to a signal of a first light emitting control signal terminal; and the fourth control circuit is configured to conduct the second electrode of the driving transistor with the light emitting device in response to a signal of a second light emitting control signal terminal.

In some examples, the second control circuit includes: a fourth transistor; and a gate of the fourth transistor is electrically connected to the second scanning signal terminal, a first electrode of the fourth transistor is electrically connected to the gate of the driving transistor, and a second electrode of the fourth transistor is electrically connected to the first electrode of the driving transistor.

In some examples, the third control circuit includes: a fifth transistor; and a gate of the fifth transistor is electrically connected to the first light emitting control signal terminal, a first electrode of the fifth transistor is electrically connected to the first power supply terminal, and a second electrode of the fifth transistor is electrically connected to the first electrode of the driving transistor.

In some examples, the fourth control circuit includes: a sixth transistor; and a gate of the sixth transistor is electrically connected to the second light emitting control signal terminal, a first electrode of the sixth transistor is electrically connected to the second electrode of the driving transistor, and a second electrode of the sixth transistor is electrically connected to the light emitting device.

In some examples, the driving circuit further includes: a storage capacitor; and a first electrode plate of the storage capacitor is electrically connected to a first power supply terminal, and a second electrode plate of the storage capacitor is electrically connected to the gate of the driving transistor.

In some examples, the first control terminal and a second scanning signal terminal are set as one signal terminal.

In some examples, the second control terminal and the second light emitting control signal terminal are set as one signal terminal.

An embodiment of the present disclosure provides a display device. The display device includes the above driving circuit.

An embodiment of the present disclosure provides a driving method for a driving circuit. The driving method includes: in an initialization phase, inputting, by a first control circuit, a control signal into an initialization circuit according to a signal of a first control terminal and a signal of a second control terminal, and providing, the initialization circuit, a signal of an initialization signal terminal to a gate of a driving transistor in response to the control signal; in a data writing phase, providing, a data writing circuit, a signal of a data signal terminal to the driving transistor in response to a signal of a first scanning signal terminal; and in a light emitting phase, generating, by the driving transistor, a driving current according to the signal of the data signal terminal, and emitting, by the light emitting device, light under the control of the driving current.

In some examples, the driving circuit further includes: a second control circuit, a third control circuit, and a fourth control circuit; and the driving method further includes: in the initialization phase, conducting, by the second control circuit, the gate of the driving transistor with a first electrode of the driving transistor in response to a signal of a second scanning signal terminal, and conducting, by the fourth control circuit, a second electrode of the driving transistor with the light emitting device in response to a signal of a second light emitting control signal terminal; in the data writing phase, conducting, by the second control circuit, the gate of the driving transistor with the first electrode of the driving transistor in response to the signal of the second scanning signal terminal; and in the light emitting phase, conducting, by the third control circuit, the first electrode of the driving transistor with a first power supply terminal in response to a signal of a first light emitting control signal terminal.

In some examples, after the data writing phase and before the light emitting phase, the driving method further includes: in a first buffering phase, providing, by the data writing circuit, the signal of the data signal terminal to the driving transistor in response to the signal of the first scanning signal terminal.

In some examples, after the first buffering phase and before the light emitting phase, the driving method further includes: in a second buffering phase, conducting, by the third control circuit, the first electrode of the driving transistor with the first power supply terminal in response to the signal of the first light emitting control signal terminal.

DETAILED DESCRIPTION OF THE EMBODIMENTS

Figure 1:
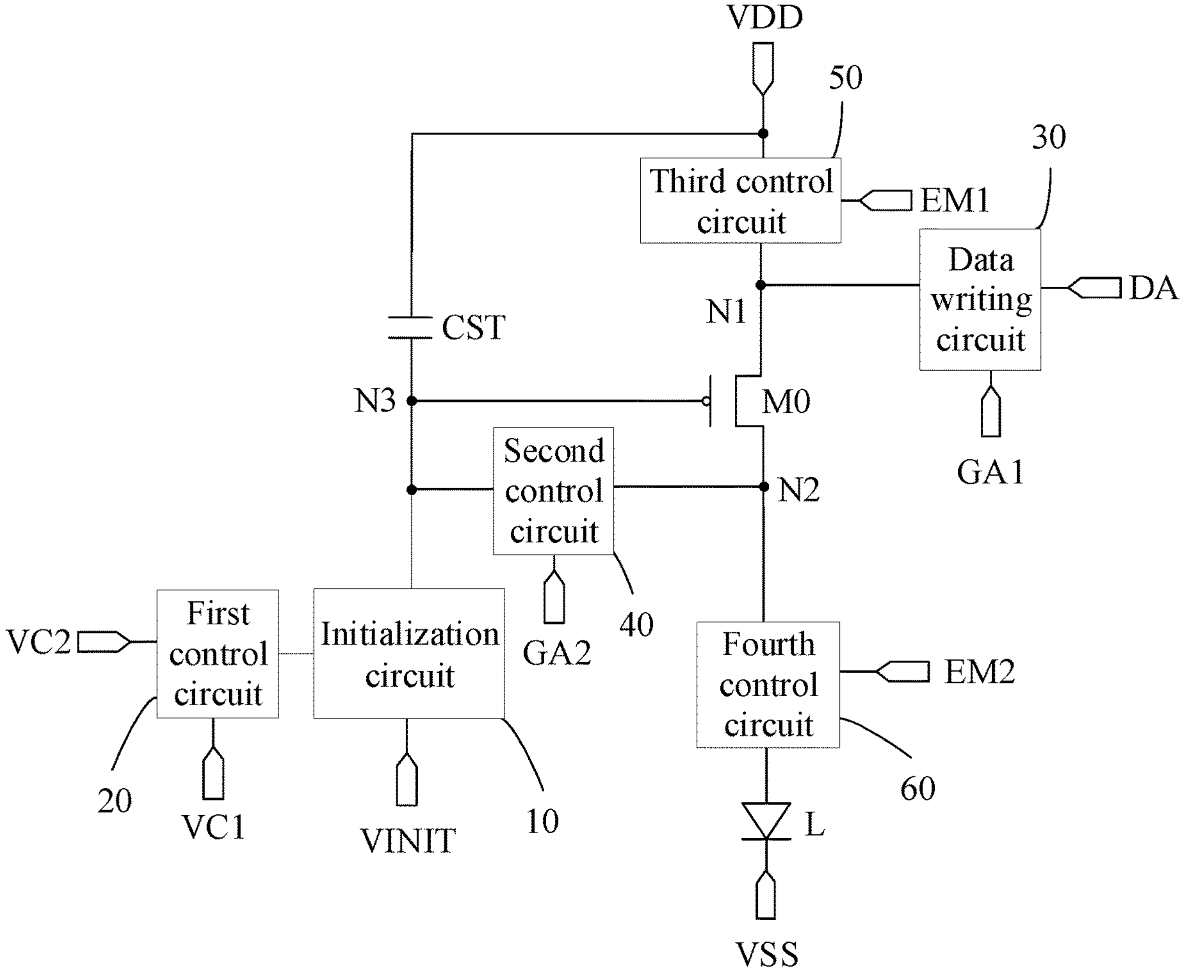
FIG. 1 is a schematic structural diagram of a pixel circuit according to an embodiment of the present disclosure.

In order to make the objectives, technical solutions, and advantages in the embodiments of the present disclosure clearer, the technical solutions in the embodiments of the present disclosure will be clearly and completely described below with reference to the accompanying drawings in the embodiments of the present disclosure. Apparently, the described embodiments are some embodiments rather than all embodiments of the present disclosure. Moreover, the embodiments in the present disclosure and features in the embodiments can be combined mutually without conflict. Based on the described embodiments of the present disclosure, all other embodiments derived by those of ordinary skill in the art without creative efforts fall within the scope of protection of the present disclosure.

Unless otherwise defined, technical or scientific terms used in the present disclosure should have ordinary meanings understood by those of ordinary skill in the art to which the present disclosure belongs. Words "first", "second", etc. used in the present disclosure do not represent any order, number, or importance, but are merely used to distinguish between different components. Words "comprise", "include", "encompass", etc. mean that elements or items before the word encompass elements or items listed after the word and their equivalents, but do not exclude other elements or items. Words "connection", "connected", etc. are not restricted to physical or mechanical connections, but can include direct or indirect electrical connections.

It is to be noted that sizes and shapes of all graphs in the accompanying drawings do not reflect true scales, and are merely to illustrate contents of the present disclosure. Moreover, the same or similar reference numerals represent the same or similar elements or elements having the same or similar function throughout.

An embodiment of the present disclosure provides a driving circuit. As shown in FIG. 1, the driving circuit may include: an initialization circuit 10 configured to provide a signal of an initialization signal terminal VINIT to a gate of a driving transistor M0 in response to a control signal; a first control circuit 20 configured to input the control signal into the initialization circuit 10 according to a signal of a first control terminal VC1 and a signal of a second control terminal VC2; a data writing circuit 30 configured to provide a signal of a data signal terminal DA to the driving transistor M0 in response to a signal of a first scanning signal terminal GA1; the driving transistor M0 configured to generate a driving current according to the signal of the data signal terminal DA; and a light emitting device L configured to emit light under the control of the driving current.

In the above driving circuit according to the embodiment of the present disclosure, by arranging the initialization circuit 10, the initialization circuit 10 may provide the signal of the initialization signal terminal VINIT to the gate of the driving transistor M0 in response to the control signal, so as to initialize the gate of the driving transistor M0. Moreover, by arranging the first control circuit 20, the first control circuit 20 may input the control signal into the initialization circuit 10 according to the signal of the first control terminal VC1 and the signal of the second control terminal VC2, so as to control the initialization circuit 10 to implement an initialization function acting on the driving transistor M0. Further, the data writing circuit 30 provides the signal of the data signal terminal DA to the driving transistor M0 in response to the signal of the first scanning signal terminal GA1. Therefore, the driving transistor M0 may generate the driving current according to a data signal of the data signal terminal DA, so as to make the light emitting device L emit the light under the control of the driving current.

During specific implementation, in the embodiment of the present disclosure, as shown in FIG. 1, the driving circuit may further include: a second control circuit 40, a third control circuit 50, and a fourth control circuit 60, where a first electrode of the driving transistor M0 is electrically connected to a first power supply terminal VDD through the third control circuit 50, and a second electrode of the driving transistor M0 is electrically connected to the light emitting device L through the fourth control circuit 60; the second control circuit 40 is configured to conduct the gate of the driving transistor M0 with the first electrode of the driving transistor M0 in response to a signal of a second scanning signal terminal GA2; the third control circuit 50 is configured to conduct the first electrode of the driving transistor M0 with the first power supply terminal VDD in response to a signal of a first light emitting control signal terminal EM1; and the fourth control circuit 60 is configured to conduct the second electrode of the driving transistor M0 with the light emitting device L in response to a signal of a second light emitting control signal terminal EM2.

During specific implementation, in the embodiment of the present disclosure, a first electrode of the light emitting device L is electrically connected to the fourth control circuit 60, and a second electrode of the light emitting device L is electrically connected to a second power supply terminal VSS. The first electrode and the second electrode of the light emitting device L may be a positive electrode and a negative electrode of the light emitting device, respectively. Exemplarily, the light emitting device L may be provided as an electroluminescent diode. For example, the light emitting device L may include: at least one of a micro light emitting diode (Micro LED), an organic light emitting diode (OLED), and a quantum dot light emitting diode (QLED). In addition, typically, the light emitting device L has a light emitting threshold voltage, and emits light when voltages at two ends of the light emitting device L are equal to or higher than the light emitting threshold voltage. In practical applications, a specific structure of the light emitting device L may be designed and determined according to practical application environments, which will not be limited herein.

During specific implementation, in the embodiment of the present disclosure, a voltage of the signal of the first power supply terminal VDD is generally positive, and a voltage of the signal of the second power supply terminal VSS is generally grounded or negative. In practical applications, a specific voltage of the signal of the first power supply terminal VDD and a specific voltage of the signal of the second power supply terminal VSS may be designed and determined according to practical application environments, which will not be limited herein.

During specific implementation, in the embodiment of the present disclosure, a voltage of the signal of the initialization signal terminal VINIT and the voltage of the signal of the second power supply terminal VSS may satisfy the following formula: –<VL. VL represents the light emitting threshold voltage of the light emitting device L.

During specific implementation, in the embodiment of the present disclosure, as shown in FIG. 1, the driving transistor M0 may be a P-type transistor. The first electrode of the driving transistor M0 is a source of the driving transistor, and the second electrode of the driving transistor M0 is a drain of the driving transistor. When the driving transistor M0 is in a saturated state, a current flows from the source to the drain of the driving transistor M0.

Certainly, during specific implementation, in the embodiment of the present disclosure, the driving transistor M0 may also be an N-type transistor. The first electrode of the driving transistor M0 is a drain of the driving transistor, and the second electrode of the driving transistor M0 is a source of the driving transistor. When the driving transistor M0 is in a saturated state, a current flows from the drain to the source of the driving transistor M0.

During specific implementation, in the embodiment of the present disclosure, as shown in FIG. 1, the driving circuit may further include: a storage capacitor CST, a first electrode plate of the storage capacitor CST being electrically connected to the first power supply terminal VDD, and a second electrode plate of the storage capacitor CST being electrically connected to the gate of the driving transistor M0.

Figure 2:
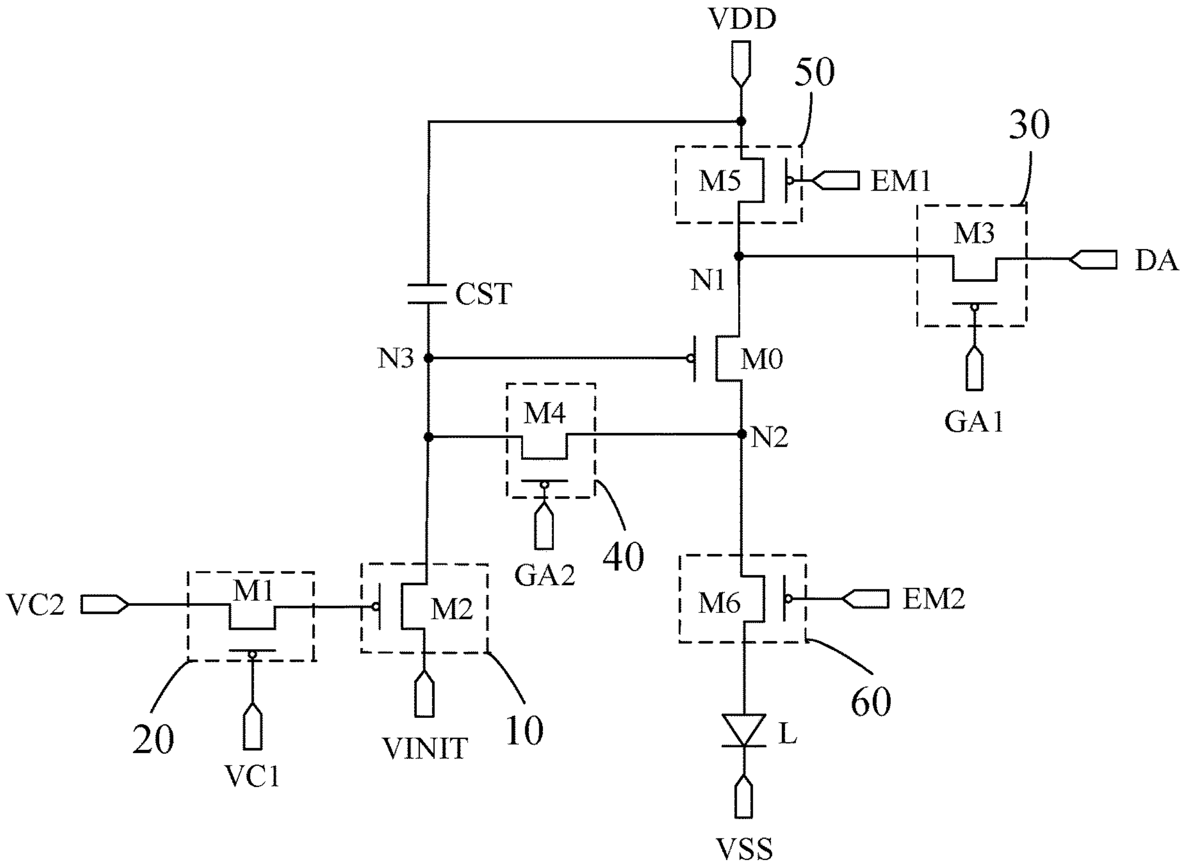
FIG. 2 shows a schematic diagram of some specific structures of a pixel circuit according to an embodiment of the present disclosure.

During specific implementation, in the embodiment of the present disclosure, as shown in FIG. 2, the first control circuit may further include: a first transistor M1, a gate of the first transistor M1 being electrically connected to the first control terminal VC1, a first electrode of the first transistor M1 being electrically connected to the second control terminal VC2, and a second electrode of the first transistor M1 being electrically connected to the initialization circuit 10.

During specific implementation, in the embodiment of the present disclosure, as shown in FIG. 2, the initialization circuit 10 may include: a second transistor M2, a gate of the second transistor M2 being electrically connected to the first control circuit, a first electrode of the second transistor M2 being electrically connected to the initialization signal terminal VINIT, and a second electrode of the second transistor M2 being electrically connected to the gate of the driving transistor M0.

During specific implementation, in the embodiment of the present disclosure, as shown in FIG. 2, the data writing circuit 30 may include: a third transistor M3, a gate of the third transistor M3 being electrically connected to the first scanning signal terminal GA1, a first electrode of the third transistor M3 being electrically connected to the data signal terminal DA, and a second electrode of the third transistor M3 being electrically connected to the first electrode of the driving transistor M0.

During specific implementation, in the embodiment of the present disclosure, as shown in FIG. 2, the second control circuit 40 may include: a fourth transistor M4, a gate of the fourth transistor M4 being electrically connected to the second scanning signal terminal GA2, a first electrode of the fourth transistor M4 being electrically connected to the gate of the driving transistor M0, and a second electrode of the fourth transistor M4 being electrically connected to the first electrode of the driving transistor M0.

During specific implementation, in the embodiment of the present disclosure, as shown in FIG. 2, the third control circuit 50 may include: a fifth transistor M5, a gate of the fifth transistor M5 being electrically connected to the first light emitting control signal terminal EM1, a first electrode of the fifth transistor M5 being electrically connected to the first power supply terminal VDD, and a second electrode of the fifth transistor M5 being electrically connected to the first electrode of the driving transistor M0.

During specific implementation, in the embodiment of the present disclosure, as shown in FIG. 2, the fourth control circuit 60 may include: a sixth transistor M6, a gate of the sixth transistor M6 being electrically connected to the second light emitting control signal terminal EM2, a first electrode of the sixth transistor M6 being electrically connected to the second electrode of the driving transistor M0, and a second electrode of the sixth transistor M6 being electrically connected to the light emitting device L.

Optionally, in order to reduce a manufacturing process, during specific implementation, in the embodiment of the present disclosure, as shown in FIG. 2, the first transistor to the sixth transistor M6 may be P-type transistors. Certainly, the first transistor to the sixth transistor M6 may also be N-type transistors, which may also be designed and determined according to practical application environments and will not be limited herein.

Further, during specific implementation, in the embodiment of the present disclosure, the P-type transistor is turned off under the action of a high-level signal and turned on under the action of a low-level signal. The N-type transistor is turned on under the action of a high-level signal and turned off under the action of a low-level signal.

It is to be noted that the transistor mentioned in the above embodiment of the present disclosure may be a thin film transistor (TFT) or a metal oxide semiconductor (MOS), which will not be limited herein.

During specific implementation, according to the type of the transistor and the signal of the gate of the transistor, the first electrode and the second electrode of the transistor may be used as the source and the drain of the transistor, respectively; or, the first electrode and the second electrode of the transistor may be used as the drain and the source of the transistor, respectively, which may be designed and determined according to practical application environments and will not be specifically distinguished herein.

The above is merely to illustrate specific structures of all circuits in the driving circuit according to the embodiment of the present disclosure. During specific implementation, specific structures of the above circuits are not limited to the above structures according to the embodiment of the present disclosure, but may also be other structures known to those skilled in the art, which falls within the scope of protection of the present disclosure and will not be specifically limited herein.

Figure 3:
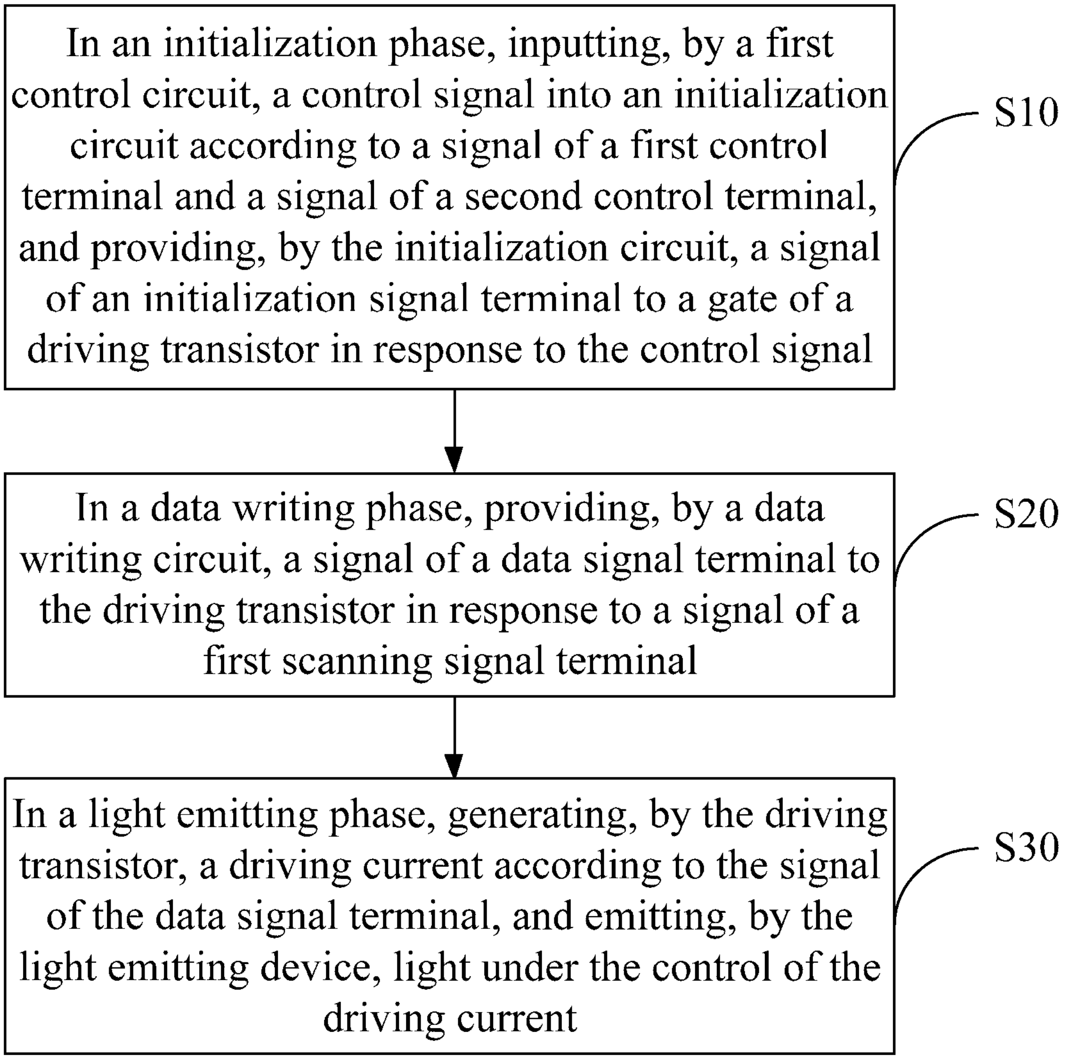
FIG. 3 is a flowchart of a driving method for a pixel circuit according to an embodiment of the present disclosure.

An embodiment of the present disclosure further provides a driving method for the above driving circuit. As shown in FIG. 3, the driving method may include the following.

S10, in an initialization phase, a first control circuit 20 inputs a control signal into an initialization circuit 10 according to a signal of a first control terminal VC1 and a signal of a second control terminal VC2, and the initialization circuit 10 provides a signal of an initialization signal terminal VINIT to a gate of a driving transistor M0 in response to the control signal.

S20, in a data writing phase, a data writing circuit 30 provides a signal of a data signal terminal DA to the driving transistor M0 in response to a signal of a first scanning signal terminal GA1.

S30, in a light emitting phase, the driving transistor M0 generates a driving current according to the signal of the data signal terminal DA, and the light emitting device L emits light under the control of the driving current.

In practical applications, owing to a manufacturing process of a technology, device aging, etc., threshold voltages Vth, for driving the light emitting devices L to emit light, of the driving transistors M0 may be non-uniform, which will cause the current flowing through each OLED to change, resulting in uneven display brightness, thereby influencing a display effect of an entire image. During specific implementation, the driving circuit may further include: a second control circuit 40, a third control circuit 50, and a fourth control circuit 60. In the embodiment of the present disclosure, the driving method may further include: in the initialization phase, the second control circuit 40 conducts the gate of the driving transistor M0 with a first electrode of the driving transistor M0 in response to a signal of a second scanning signal terminal GA2, and the fourth control circuit 60 conducts a second electrode of the driving transistor M0 with the light emitting device L in response to a signal of a second light emitting control signal terminal EM2; in the data writing phase, the second control circuit 40 conducts the gate of the driving transistor M0 with the first electrode of the driving transistor M0 in response to the signal of the second scanning signal terminal GA2; and in the light emitting phase, the third control circuit 50 conducts the first electrode of the driving transistor M0 with a first power supply terminal VDD in response to a signal of a first light emitting control signal terminal EM1.

Figure 4:
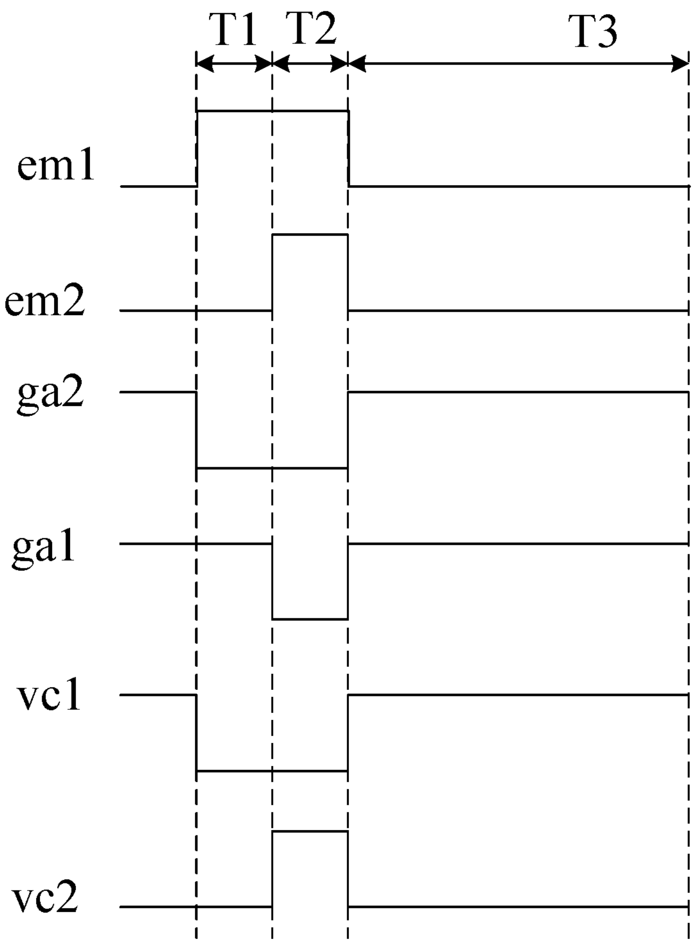
FIG. 4 shows a diagram of some signal timings according to an embodiment of the present disclosure.

With the driving circuit shown in FIG. 2 as an example, an operation process of the above driving circuit according to the embodiment of the present disclosure is described below in combination with a diagram of signal timings shown in FIG. 4. As shown in FIG. 4, em1 represents the signal of the first light emitting control signal terminal EM1, em2 represents the signal of the second light emitting control signal terminal EM2, ga1 represents the signal of the first scanning signal terminal GA1, ga2 represents the signal of the second scanning signal terminal GA2, vc1 represents the signal of the first control terminal VC1, and vc2 represents the signal of the second control terminal VC2. Moreover, the operation process of one driving circuit in a display frame may include: an initialization phase T1, a data writing phase T2, and a light emitting phase T3.

In the initialization phase T1, a first transistor M1 is turned on under the control of a low level of the signal vc1, to provide a low level of the signal vc2 to a gate of a second transistor M2. That is, the low level of the signal vc2 is provided to the second transistor M2 as the control signal, so as to turn on the second transistor M2. In this way, the signal of the initialization signal terminal VINIT may be provided to the gate N3 of the driving transistor M0 through the second transistor M2 which is turned on. Therefore, a voltage of the gate N3 of the driving transistor M0 is Vinit, and the gate N3 of the driving transistor M0 is initialized. Moreover, a fourth transistor M4 is turned on under the control of a low level of the signal ga2, and a sixth transistor M6 is also turned on under the control of a low level of the signal em2. In this way, the signal of the initialization signal terminal VINIT may be provided to a first electrode of the light emitting device L through the fourth transistor M4 and the sixth transistor M6 which are turned on, so as to initialize the first electrode of the light emitting device L. Further, the fifth transistor M5 is turned off under the control of a high level of the signal em1. The third transistor M3 is turned off under the control of a high level of the signal ga1.

In the data writing phase T2, the first transistor M1 is turned on under the control of the low level of the signal vc1, to provide a high level of the signal vc2 to the gate of the second transistor M2. That is, the low level of the signal vc2 is provided to the second transistor M2 as the control signal, so as to turn off the second transistor M2. The third transistor M3 is turned on under the control of a low level of the signal ga1, to provide the data signal of the data signal terminal DA to the first electrode N1 of the driving transistor M0. Therefore, a voltage of the first electrode N1 of the driving transistor M0 is a voltage Vda of the data signal. Moreover, the fourth transistor M4 is turned on under the control of the low level of the signal ga2, so that the driving transistor M0 may be in a diode connection manner. In this way, the voltage Vda of the first electrode N1 of the driving transistor M0 charges the gate N3 of the driving transistor M0. Therefore, a voltage of the gate N3 of the driving transistor M0 is Vda+|Vth|, and stored through a storage capacitor CST. Further, the fifth transistor M5 is turned off under the control of the high level of the signal em1. The sixth transistor M6 is turned off under the control of a high level of the signal em2.

In the light emitting phase T3, the fifth transistor M5 is turned on under the control of a low level of the signal em1, and the fifth transistor M5 which is turned on may provide the voltage Vdd of the first power supply terminal VDD to the first electrode N1 of the driving transistor M0. Therefore, the voltage of the first electrode N1 of the driving transistor M0 is Vdd. In this way, the driving transistor M0 may be in a saturated state, so that the driving transistor M0 generates a driving current Ids ($Ids=K\ (Vda-Vdd)^2$). Moreover, the sixth transistor M6 is turned on under the control of the low level of the signal em2, and the sixth transistor M6 which is turned on may conduct the second electrode N2 of the driving transistor M0 with the first electrode of the light emitting device L. Therefore, the driving current Ids flows into the light emitting device L to drive the light emitting device L to emit light. K is a structural constant relevant to the technology and design. Moreover, the first transistor M1 is turned off under the control of a high level of the signal vc1, and the third transistor M3 is turned off under the control of the high level of the signal ga1. The fourth transistor M4 is turned off under the control of the high level of the signal ga2.

As may be seen from the above formula $Ids=K(Vda-Vdd)^2$, the driving current Ids generated by the driving transistor M0 is only relevant to the voltage Vdd of the first power supply terminal VDD and the voltage Vda of the data signal terminal DA, instead of the threshold voltage Vth of the driving transistor M0. Therefore, the influence, on the driving current, from the shift of the threshold voltage Vth of the driving transistor M0 may be solved, the driving current for the light emitting device L remains stable, thereby ensuring the normal operation of the light emitting device L.

In some other examples, in the embodiment of the present disclosure, the driving method may further include: in a first buffering phase after the data writing phase and before the light emitting phase, the data writing circuit 30 provides the signal of the data signal terminal DA to the driving transistor M0 in response to the signal of the first scanning signal terminal GA1.

Figure 5:
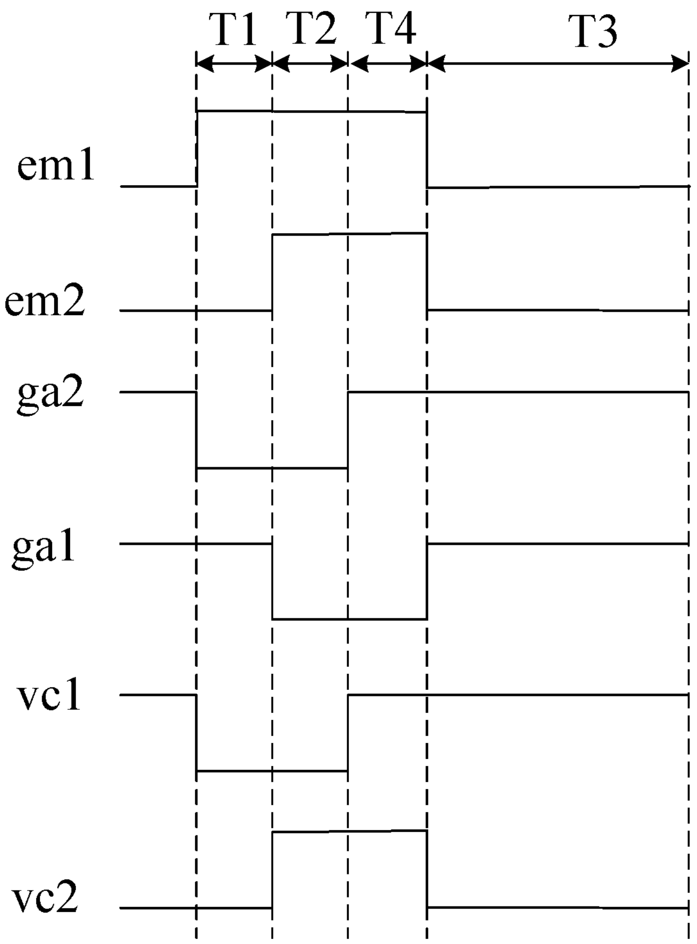
FIG. 5 shows a diagram of some other signal timings according to an embodiment of the present disclosure.

With the driving circuit shown in FIG. 2 as an example, an operation process of the above driving circuit according to the embodiment of the present disclosure is described below in combination with a diagram of circuit timings shown in FIG. 5. As shown in FIG. 5, em1 represents the signal of the first light emitting control signal terminal EM1, em2 represents the signal of the second light emitting control signal terminal EM2, ga1 represents the signal of the first scanning signal terminal GA1, ga2 represents the signal of the second scanning signal terminal GA2, vc1 represents the signal of the first control terminal VC1, and vc2 represents the signal of the second control terminal VC2. Moreover, an operation process of one driving circuit in one display frame may include: an initialization phase T1, a data writing phase T2, a first buffering phase T4, and a light emitting phase T3.

In the initialization phase T1, a first transistor M1 is turned on under the control of a low level of the signal vc1, to provide a low level of the signal vc2 to a gate of a second transistor M2. That is, the low level of the signal vc2 is provided to the second transistor M2 as the control signal, so as to turn on the second transistor M2. In this way, the signal of the initialization signal terminal VINIT may be provided to the gate N3 of the driving transistor M0 through the second transistor M2 which is turned on. Therefore, a voltage of the gate N3 of the driving transistor M0 is Vinit, and the gate N3 of the driving transistor M0 is initialized. Moreover, a fourth transistor M4 is turned on under the control of a low level of the signal ga2, and a sixth transistor M6 is also turned on under the control of a low level of the signal em2. In this way, the signal of the initialization signal terminal VINIT may be provided to a first electrode of the light emitting device L through the fourth transistor M4 and the sixth transistor M6 which are turned on, so as to initialize the first electrode of the light emitting device L. Further, the fifth transistor M5 is turned off under the control of a high level of the signal em1. The third transistor M3 is turned off under the control of a high level of the signal ga1.

In the data writing phase T2, the first transistor M1 is turned on under the control of the low level of the signal vc1, to provide a high level of the signal vc2 to the gate of the second transistor M2. That is, the low level of the signal vc2 is provided to the second transistor M2 as the control signal, so as to turn off the second transistor M2. The third transistor M3 is turned on under the control of a low level of the signal ga1, to provide the data signal of the data signal terminal DA to the first electrode N1 of the driving transistor M0. Therefore, a voltage of the first electrode N1 of the driving transistor M0 is a voltage Vda of the data signal. Moreover, the fourth transistor M4 is turned on under the control of the low level of the signal ga2, so that the driving transistor M0 may be in a diode connection manner. In this way, the voltage Vda of the first electrode N1 of the driving transistor M0 charges the gate N3 of the driving transistor M0. Therefore, a voltage of the gate N3 of the driving transistor M0 is Vda+|Vth|, and stored through a storage capacitor CST. Further, the fifth transistor M5 is turned off under the control of the high level of the signal em1. The sixth transistor M6 is turned off under the control of a high level of the signal em2.

In the first buffering phase T4, the third transistor M3 is turned on under the control of the low level of the signal ga1, to provide the data signal of the data signal terminal DA to the first electrode N1 of the driving transistor M0. Therefore, the voltage of the first electrode N1 of the driving transistor M0 continues being the voltage Vda of the data signal. Moreover, the first transistor M1 is turned off under the control of a high level of the signal vc1. The fourth transistor M4 is turned off under the control of a high level of the signal ga2. The fifth transistor M5 is turned off under the control of the high level of the signal em1. The sixth transistor M6 is turned off under the control of the high level of the signal em2.

In the light emitting phase T3, the fifth transistor M5 is turned on under the control of a low level of the signal em1, and the fifth transistor M5 which is turned on may provide the voltage Vdd of the first power supply terminal VDD to the first electrode N1 of the driving transistor M0. Therefore, the voltage of the first electrode N1 of the driving transistor M0 is Vdd. In this way, the driving transistor M0 may be in a saturated state, so that the driving transistor M0 generates a driving current Ids ($Ids=K\ (Vda-Vdd)^2$). Moreover, the sixth transistor M6 is turned on under the control of the low level of the signal em2, and the sixth transistor M6 which is turned on may conduct the second electrode N2 of the driving transistor M0 with the first electrode of the light emitting device L. Therefore, the driving current Ids flows into the light emitting device L to drive the light emitting device L to emit light. K is a structural constant relevant to the technology and design. Moreover, the first transistor M1 is turned off under the control of the high level of the signal vc1, and the third transistor M3 is turned off under the control of the high level of the signal ga1. The fourth transistor M4 is turned off under the control of the high level of the signal ga2.

It is to be noted that the signal ga1 of the first scanning signal terminal GA1 is set at the low level in the first buffering phase T4, so that the third transistor M3 may continue to be turned on, so as to be charged more fully.

In yet some other examples, in the embodiment of the present disclosure, the driving method may further include: in a second buffering phase after the first buffering phase and before the light emitting phase, the third control circuit 50 conducts the first electrode of the driving transistor M0 with the first power supply terminal VDD in response to the signal of the first light emitting control signal terminal EM1.

Figure 6:
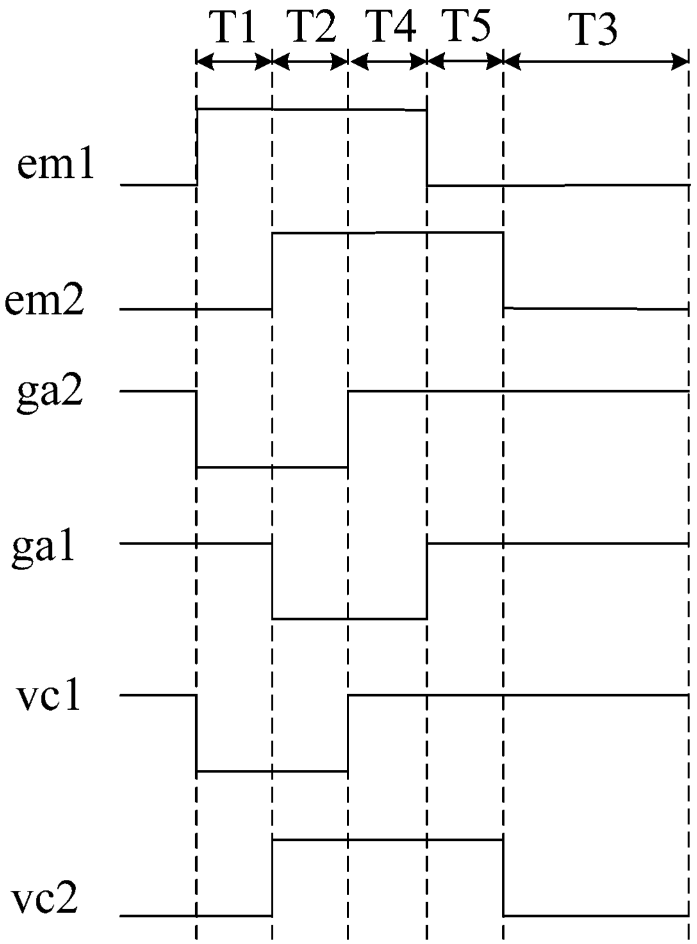
FIG. 6 shows a diagram of yet some other signal timings according to an embodiment of the present disclosure.

With the driving circuit shown in FIG. 2 as an example, an operation process of the above driving circuit according to the embodiment of the present disclosure is described below in combination with a diagram of circuit timings shown in FIG. 6. As shown in FIG. 6, em1 represents the signal of the first light emitting control signal terminal EM1, em2 represents the signal of the second light emitting control signal terminal EM2, ga1 represents the signal of the first scanning signal terminal GA1, ga2 represents the signal of the second scanning signal terminal GA2, vc1 represents the signal of the first control terminal VC1, and vc2 represents the signal of the second control terminal VC2. Moreover, an operation process of one driving circuit in one display frame may include: an initialization phase T1, a data writing phase T2, a first buffering phase T4, and a light emitting phase T3.

In the initialization phase T1, a first transistor M1 is turned on under the control of a low level of the signal vc1, to provide a low level of the signal vc2 to a gate of a second transistor M2. That is, the low level of the signal vc2 is provided to the second transistor M2 as the control signal, so as to turn on the second transistor M2. In this way, the signal of the initialization signal terminal VINIT may be provided to the gate N3 of the driving transistor M0 through the second transistor M2 which is turned on. Therefore, a voltage of the gate N3 of the driving transistor M0 is Vinit, and the gate N3 of the driving transistor M0 is initialized. Moreover, a fourth transistor M4 is turned on under the control of a low level of the signal ga2, and a sixth transistor M6 is also turned on under the control of a low level of the signal em2. In this way, the signal of the initialization signal terminal VINIT may be provided to a first electrode of the light emitting device L through the fourth transistor M4 and the sixth transistor M6 which are turned on, so as to initialize the first electrode of the light emitting device L. Further, the fifth transistor M5 is turned off under the control of a high level of the signal em1. The third transistor M3 is turned off under the control of a high level of the signal ga1.

In the data writing phase T2, the first transistor M1 is turned on under the control of the low level of the signal vc1, to provide a high level of the signal vc2 to the gate of the second transistor M2. That is, the low level of the signal vc2 is provided to the second transistor M2 as the control signal, so as to turn off the second transistor M2. The third transistor M3 is turned on under the control of a low level of the signal ga1, to provide the data signal of the data signal terminal DA to the first electrode N1 of the driving transistor M0. Therefore, a voltage of the first electrode N1 of the driving transistor M0 is a voltage Vda of the data signal. Moreover, the fourth transistor M4 is turned on under the control of the low level of the signal ga2, so that the driving transistor M0 may be in a diode connection manner. In this way, the voltage Vda of the first electrode N1 of the driving transistor M0 charges the gate N3 of the driving transistor M0. Therefore, a voltage of the gate N3 of the driving transistor M0 is Vda+|Vth|, and stored through a storage capacitor CST. Further, the fifth transistor M5 is turned off under the control of the high level of the signal em1. The sixth transistor M6 is turned off under the control of a high level of the signal em2.

In the first buffering phase T4, the third transistor M3 is turned on under the control of the low level of the signal ga1, to provide the data signal of the data signal terminal DA to the first electrode N1 of the driving transistor M0. Therefore, the voltage of the first electrode N1 of the driving transistor M0 continues being the voltage Vda of the data signal. Moreover, the first transistor M1 is turned off under the control of a high level of the signal vc1. The fourth transistor M4 is turned off under the control of a high level of the signal ga2. The fifth transistor M5 is turned off under the control of the high level of the signal em1. The sixth transistor M6 is turned off under the control of the high level of the signal em2.

In the second buffering phase T5, the fifth transistor M5 is turned on under the control of a low level of the signal em1, to provide the voltage Vdd of the first power supply terminal VDD to the first electrode N1 of the driving transistor M0. Therefore, the voltage of the first electrode N1 of the driving transistor M0 is Vdd. In this way, the first electrode N1 of the driving transistor M0 may be pre-charged through the first power supply terminal VDD. Moreover, the first transistor M1 is turned off under the control of the high level of the signal vc1. The fourth transistor M4 is turned off under the control of the high level of the signal ga2. The fifth transistor M5 is turned off under the control of the high level of the signal em1. The sixth transistor M6 is turned off under the control of the high level of the signal em2. The third transistor M3 is turned off under the control of the high level of the signal ga1.

In the light emitting phase T3, the fifth transistor M5 is turned on under the control of the low level of the signal em1, and the fifth transistor M5 which is turned on may provide the voltage Vdd of the first power supply terminal VDD to the first electrode N1 of the driving transistor M0. Therefore, the voltage of the first electrode N1 of the driving transistor M0 is Vdd. In this way, the driving transistor M0 may be in a saturated state, so that the driving transistor M0 generates a driving current Ids ($Ids=K(Vda-Vdd)^2$). Moreover, the sixth transistor M6 is turned on under the control of the low level of the signal em2, and the sixth transistor M6 which is turned on may conduct the second electrode N2 of the driving transistor M0 with the first electrode of the light emitting device L. Therefore, the driving current Ids flows into the light emitting device L to drive the light emitting device L to emit light. K is a structural constant relevant to the technology and design. Moreover, the first transistor M1 is turned off under the control of the high level of the signal vc1, and the third transistor M3 is turned off under the control of the high level of the signal ga1. The fourth transistor M4 is turned off under the control of the high level of the signal ga2.

It is to be noted that the signal ga1 of the first scanning signal terminal GA1 is set at the low level in the first buffering phase T4, so that the third transistor M3 may continue to be turned on, so as to be charged more fully.

It is to be noted that in the second buffering phase T5, the signal em2 of the second light emitting control signal terminal EM2 is at the high level, so as to control the sixth transistor M6 to be turned off. In this way, after the voltage of the gate of the driving transistor M0 is further stabilized, the current generated by the driving transistor M0 is further stabilized and then provided to the light emitting device L, thereby further improving the light emitting stability of the light emitting device L.

Figure 7:
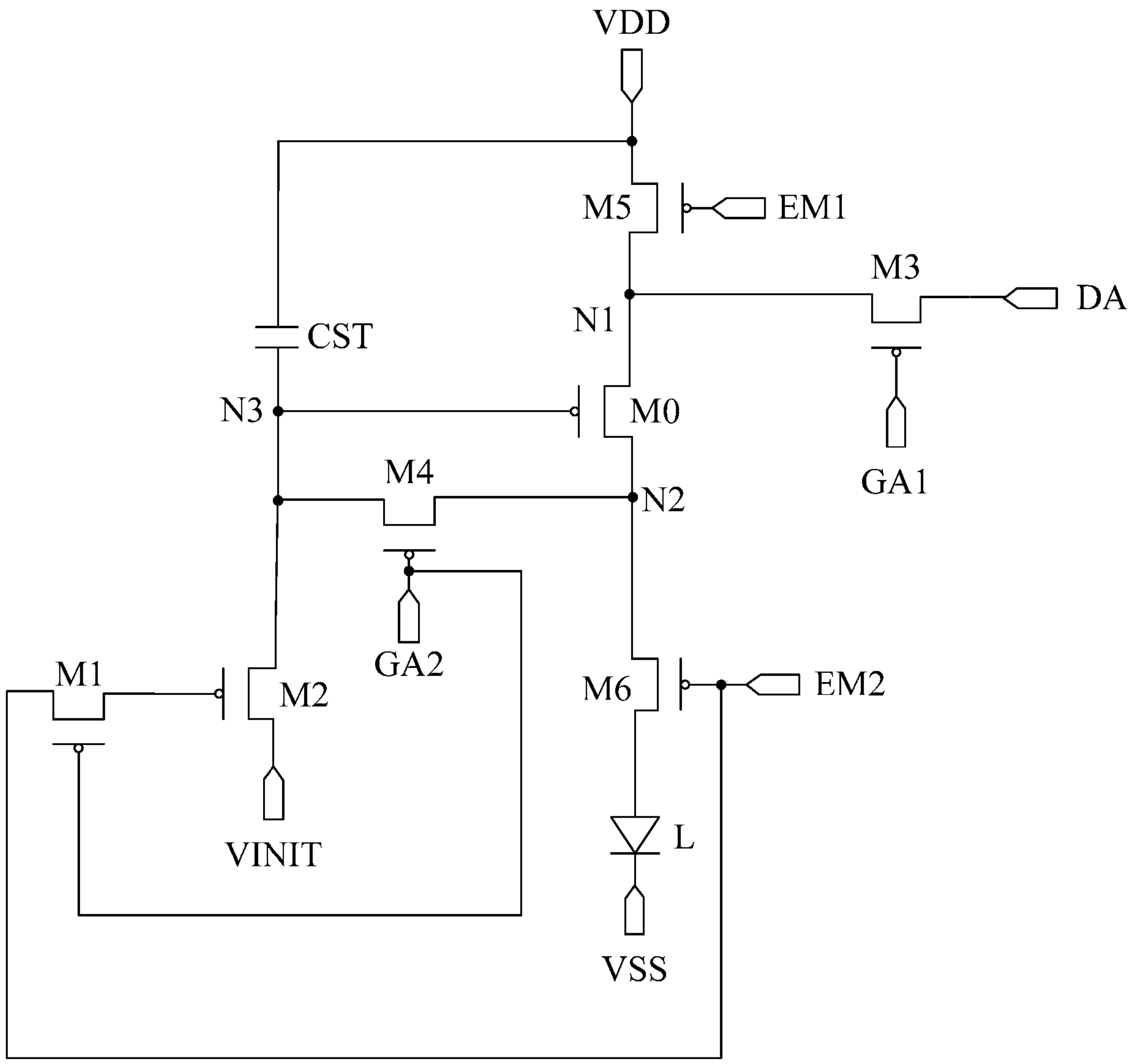
FIG. 7 shows a schematic diagram of some other specific structures of a pixel circuit according to an embodiment of the present disclosure.

An embodiment of the present disclosure provides some other pixel circuits with the schematic structural diagram shown in FIG. 7, which makes variations to an implementation mode in the above embodiment. Only the differences between the present embodiment and the above embodiment are described below, and their similarities will not be repeated herein.

During specific implementation, the signal vc1 of the first control terminal VC1 may be the same as the signal ga2 of the second scanning signal terminal GA2. Exemplarily, the first control terminal VC1 and the second scanning signal terminal GA2 may be set as one signal terminal. For example, as shown in FIG. 7, the gate of the first transistor M1 may be electrically connected to the second scanning signal terminal GA2.

During specific implementation, the signal vc2 of the second control terminal VC2 may be the same as the signal em2 of the second light emitting control signal terminal EM2. Exemplarily, the second control terminal VC2 and the second light emitting control signal terminal EM2 may be set as one signal terminal. For example, as shown in FIG. 7, the first electrode of the first transistor M1 may be electrically connected to the second light emitting control signal terminal EM2.

Reference may be made to FIGS. 4-6 for a diagram of signal timings of the pixel circuit shown in FIG. 7. Moreover, reference may also be made to the operation process of the pixel circuit shown in FIG. 2 in combination with the diagrams of signal timings shown in FIGS. 4-6 for a specific operation process of the pixel circuit shown in FIG. 7, which will not be specifically repeated herein.

Figure 8:
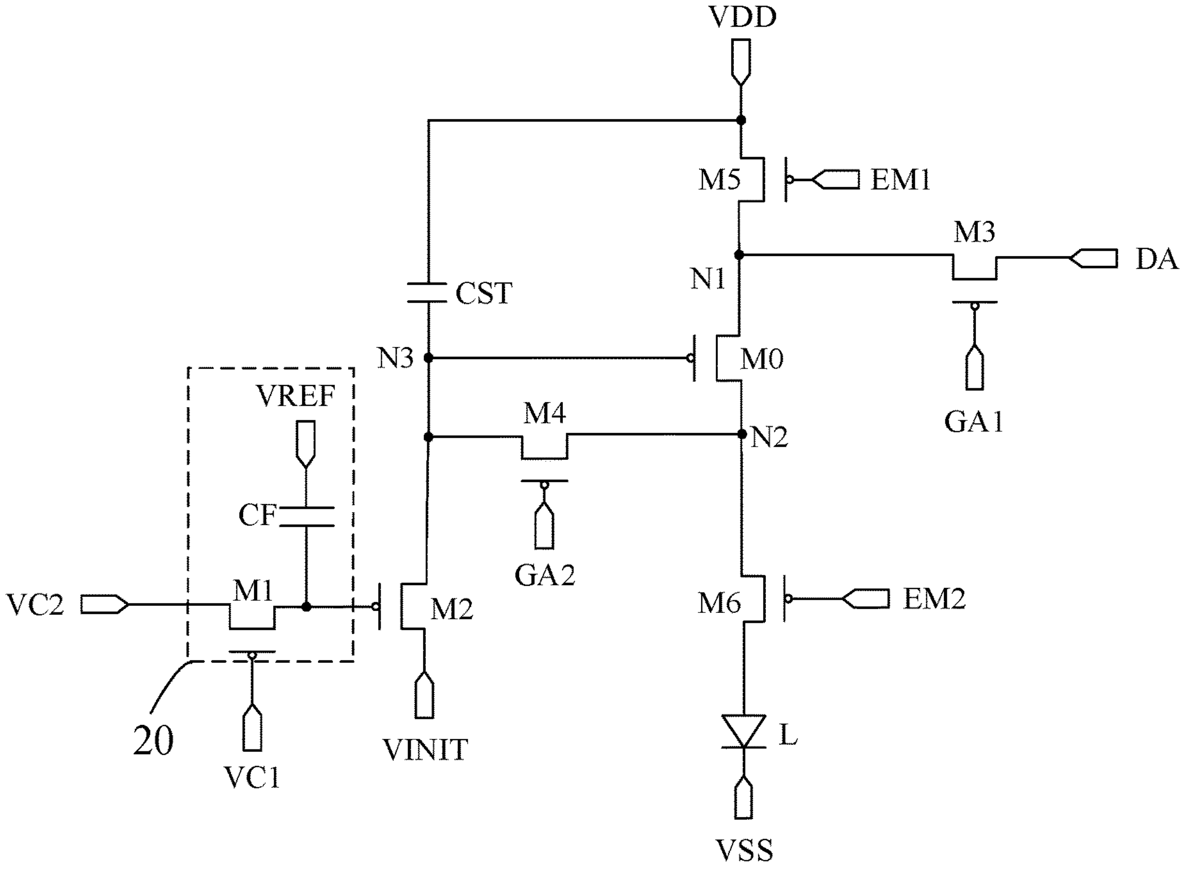
FIG. 8 shows a schematic diagram of yet some other specific structures of a pixel circuit according to an embodiment of the present disclosure.

An embodiment of the present disclosure provides yet some other pixel circuits with the schematic structural diagram shown in FIG. 8, which makes variations to an implementation mode in the above embodiment. Only the differences between the present embodiment and the above embodiment are described below, and their similarities will not be repeated herein.

During specific implementation, in the embodiment of the present disclosure, as shown in FIG. 8, the driving circuit 20 may further include: a voltage stabilization capacitor CF, a first electrode plate of the voltage stabilization capacitor CF being electrically connected to the second electrode of the first transistor M1, and a second electrode plate of the voltage stabilization capacitor CF being electrically connected to a reference signal terminal VREF. In this way, when the first transistor M1 is turned off, a voltage of the gate of the second transistor M2 may be stabilized through the voltage stabilization capacitor CF, so as to further ensure that the second transistor M2 is in a turned-off state.

For example, as shown in FIGS. 4-6, in the data writing phase T2, the first transistor M1 provides the high level of the signal vc2 to the gate of the second transistor M2, and the high level is stored through the voltage stabilization capacitor CF, so that the second transistor M2 is turned off. In the light emitting phase T3, the first transistor M1 is turned off, and a level of the second transistor M2 may be stabilized as a high level under the action of the voltage stabilization capacitor CF, so as to further ensure that the second transistor M2 is in the turned-off state. Therefore, the signal of the initialization signal terminal is prevented from influencing the voltage of the gate of the driving transistor, thereby further improving the light emitting stability.

Exemplarily, a voltage of the reference signal terminal VREF may be fixed. For example, the reference signal terminal VREF and the first power supply terminal VDD may be set as one signal terminal. Alternatively, the reference signal terminal VREF and the second power supply terminal VSS may also be set as one signal terminal. Alternatively, the reference signal terminal VREF and the initialization signal terminal VINIT may also be set as one signal terminal, which will not be limited herein.

Figure 9:
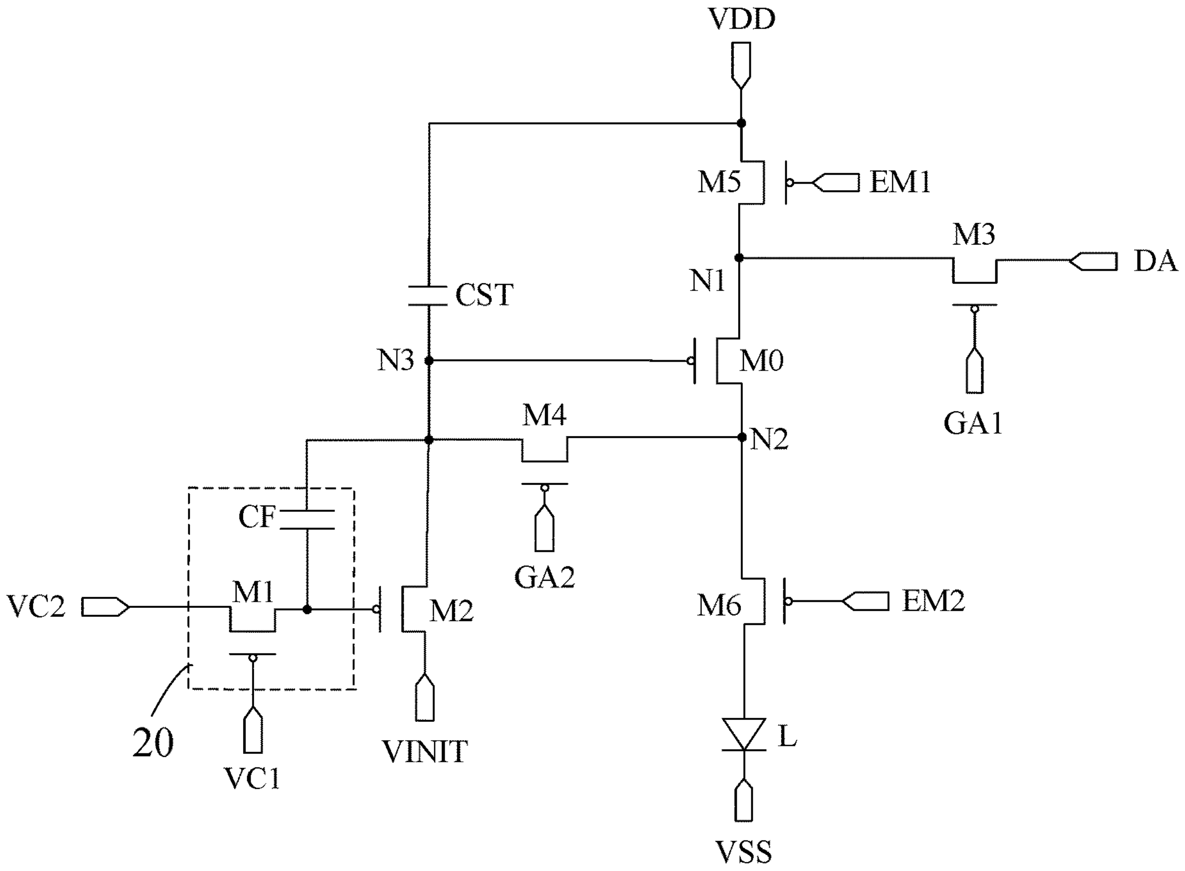
FIG. 9 shows a schematic diagram of still some other specific structures of a pixel circuit according to an embodiment of the present disclosure.

An embodiment of the present disclosure provides still some other pixel circuits with the schematic structural diagrams shown in FIG. 9, which makes variations to an implementation mode in the above embodiment. Only the differences between the present embodiment and the above embodiment are described below, and their similarities will not be repeated herein.

During specific implementation, in the embodiment of the present disclosure, as shown in FIG. 9, the first control circuit 20 may further include: a voltage stabilization capacitor CF, a first electrode plate of the voltage stabilization capacitor CF being electrically connected to the second electrode of the first transistor M1, and a second electrode plate of the voltage stabilization capacitor CF being electrically connected to the gate of the driving transistor M0. In this way, when the first transistor M1 is turned off, a voltage of the gate of the second transistor M2 may be stabilized through the voltage stabilization capacitor CF, so as to further ensure that the second transistor M2 is in a turned-off state. Further, the voltage of the gate of the driving transistor is further stabilized through the voltage stabilization capacitor CF.

For example, as shown in FIGS. 4-6, in the data writing phase T2, the first transistor M1 provides the high level of the signal vc2 to the gate of the second transistor M2, and the high level is stored through the voltage stabilization capacitor CF, so that the second transistor M2 is turned off. In the light emitting phase T3, the first transistor M1 is turned off, and a level of the second transistor M2 may be stabilized as a high level under the action of the voltage stabilization capacitor CF, so as to further ensure that the second transistor M2 is in the turned-off state. Therefore, the signal of the initialization signal terminal is prevented from influencing the voltage of the gate of the driving transistor, thereby further improving the light emitting stability.

Moreover, in the data writing phase T2, the voltage $Vda+|Vth|$ of the gate of the driving transistor is also stored through the voltage stabilization capacitor CF. Therefore, the voltage of the gate of the driving transistor is further stabilized through the voltage stabilization capacitor CF, thereby improving the light emitting stability.

An embodiment of the present disclosure further provides a display device. The display device includes the above pixel circuit according to the embodiment of the present disclosure. The principle for solving the problem of the display device is similar to that of the foregoing pixel circuit. Therefore, reference may be made to the implementation of the foregoing pixel circuit for the implementation of the display device, and the repetitions will not be repeated herein.

During specific implementation, in the embodiment of the present disclosure, the display device may be any product or part with a display function, for example, a mobile phone, a tablet personal computer, a television, a display, a notebook computer, a digital photo frame, a navigator, etc. Other essential components of the display device are those that a person of ordinary skill in the art should understand, and will be neither repeated herein nor intended to limit the present disclosure.

During specific implementation, in the embodiment of the present disclosure, the display device may include: a plurality of pixel units which are distributed in an array and positioned in a display region. Each pixel unit includes a plurality of sub-pixels. Exemplarily, one driving circuit described above is provided for one sub-pixel.

Exemplarily, the pixel unit may include red sub-pixels, green sub-pixels, and blue sub-pixels, so as to realize color display by mixing red, green, and blue. Alternatively, the pixel unit may further include red sub-pixels, green sub-pixels, blue sub-pixels, and white sub-pixels, so as to realize color display by mixing red, green, blue, and white. Certainly, in practical applications, a light emitting color of the sub-pixel in the pixel unit may be designed and determined according to practical application environments, which will not be limited herein.

Although the preferred embodiments of the present disclosure have been described, those skilled in the art can also make additional alterations and modifications to these embodiments once they know the basic creative concept. Thus, it is intended that the appended claims are to be interpreted as including the preferred embodiments and all alterations and modifications that fall within the scope of the present disclosure.

Apparently, those skilled in the art can make various modifications and variations to the embodiments of the present disclosure without departing from the spirit and scope of the embodiments of the present disclosure. In this way, if these modifications and variations to the embodiments of the present disclosure fall within the scope of the claims of the present disclosure and their equivalents, it is intended that the present disclosure also encompass these modifications and variations.

What is claimed is:

1. A driving circuit, comprising:

an initialization circuit, configured to provide a signal of an initialization signal terminal to a gate of a driving transistor in response to a control signal;

a first control circuit, configured to input the control signal into the initialization circuit according to a signal of a first control terminal and a signal of a second control terminal;

a data writing circuit, configured to provide a signal of a data signal terminal to the driving transistor in response to a signal of a first scanning signal terminal;

the driving transistor, configured to generate a driving current according to the signal of the data signal terminal; and a light emitting device, configured to emit light under a control of the driving current;

wherein the first control circuit comprises: a first transistor; and a gate of the first transistor is electrically connected to the first control terminal, a first electrode of the first transistor is electrically connected to the second control terminal, and a second electrode of the first transistor is electrically connected to the initialization circuit;

wherein the first control circuit further comprises: a voltage stabilization capacitor; and a first electrode plate of the voltage stabilization capacitor is electrically connected to the second electrode of the first transistor, and a second electrode plate of the voltage stabilization capacitor is electrically connected to a reference signal terminal; or a first electrode plate of the voltage stabilization capacitor is electrically connected to the second electrode of the first transistor, and a second electrode plate of the voltage stabilization capacitor is electrically connected to the gate of the driving transistor.

2. The driving circuit according to claim 1, wherein the reference signal terminal and one of the initialization signal terminal and a first power supply terminal are set as one signal terminal.

3. The driving circuit according to claim 1, wherein the initialization circuit comprises: a second transistor; and a gate of the second transistor is electrically connected to the first control circuit, a first electrode of the second transistor is electrically connected to the initialization signal terminal, and a second electrode of the second transistor is electrically connected to the gate of the driving transistor.

4. The driving circuit according to claim 1, wherein the data writing circuit comprises: a third transistor; and a gate of the third transistor is electrically connected to the first scanning signal terminal, a first electrode of the third transistor is electrically connected to the data signal terminal, and a second electrode of the third transistor is electrically connected to a first electrode of the driving transistor.

5. The driving circuit according to claim 1, further comprising: a second control circuit, a third control circuit, and a fourth control circuit, wherein a first electrode of the driving transistor is electrically connected to a first power supply terminal through the third control circuit, and a second electrode of the driving transistor is electrically connected to the light emitting device through the fourth control circuit;

the second control circuit is configured to conduct the gate of the driving transistor with the second electrode of the driving transistor in response to a signal of a second scanning signal terminal;

the third control circuit is configured to conduct the first electrode of the driving transistor with the first power supply terminal in response to a signal of a first light emitting control signal terminal; and the fourth control circuit is configured to conduct the second electrode of the driving transistor with the light emitting device in response to a signal of a second light emitting control signal terminal.

6. The driving circuit according to claim 5, wherein the second control circuit comprises: a fourth transistor; and a gate of the fourth transistor is electrically connected to the second scanning signal terminal, a first electrode of the fourth transistor is electrically connected to the gate of the driving transistor, and a second electrode of the fourth transistor is electrically connected to the second electrode of the driving transistor.

7. The driving circuit according to claim 5, wherein the third control circuit comprises:

a fifth transistor; and a gate of the fifth transistor is electrically connected to the first light emitting control signal terminal, a first electrode of the fifth transistor is electrically connected to the first power supply terminal, and a second electrode of the fifth transistor is electrically connected to the first electrode of the driving transistor.

8. The driving circuit according to claim 5, wherein the fourth control circuit comprises: a sixth transistor; and a gate of the sixth transistor is electrically connected to the second light emitting control signal terminal, a first electrode of the sixth transistor is electrically connected to the second electrode of the driving transistor, and a second electrode of the sixth transistor is electrically connected to the light emitting device.

9. The driving circuit according to claim 5, wherein the first control terminal and a second scanning signal terminal are set as one signal terminal.

10. The driving circuit according to claim 5, wherein the second control terminal and a second light emitting control signal terminal are set as one signal terminal.

11. The driving circuit according to claim 1, further comprising: a storage capacitor; and a first electrode plate of the storage capacitor is electrically connected to a first power supply terminal, and a second electrode plate of the storage capacitor is electrically connected to the gate of the driving transistor.

12. A display device, comprising the driving circuit according to claim 1.

13. A driving method for a driving circuit, wherein the driving circuit is according to claim 1, comprising:

in an initialization phase, inputting, by a first control circuit, a control signal into an initialization circuit according to a signal of a first control terminal and a signal of a second control terminal, and providing, by the initialization circuit, a signal of an initialization signal terminal to a gate of a driving transistor in response to the control signal;

in a data writing phase, providing, by a data writing circuit, a signal of a data signal terminal to the driving transistor in response to a signal of a first scanning signal terminal; and in a light emitting phase, generating, by the driving transistor, a driving current according to the signal of the data signal terminal, and emitting, by the light emitting device, light under a control of the driving current.

14. The driving method according to claim 13, wherein the driving circuit further comprises: a second control circuit, a third control circuit, and a fourth control circuit; and the driving method further comprises:

in the initialization phase, conducting, by the second control circuit, the gate of the driving transistor with a second electrode of the driving transistor in response to a signal of a second scanning signal terminal, and conducting, by the fourth control circuit, a second electrode of the driving transistor with the light emitting device in response to a signal of a second light emitting control signal terminal;

in the data writing phase, conducting, by the second control circuit, the gate of the driving transistor with the second electrode of the driving transistor in response to the signal of the second scanning signal terminal; and in the light emitting phase, conducting, by the third control circuit, the first electrode of the driving transistor with a first power supply terminal in response to a signal of a first light emitting control signal terminal.

15. The driving method according to claim 14, wherein after the data writing phase and before the light emitting phase, the driving method further comprises:

in a first buffering phase, providing, by the data writing circuit, the signal of the data signal terminal to the driving transistor in response to the signal of the first scanning signal terminal.

16. The driving method according to claim 15, wherein after the first buffering phase and before the light emitting phase, the driving method further comprises:

in a second buffering phase, conducting, by the third control circuit, the first electrode of the driving transistor with the first power supply terminal in response to the signal of the first light emitting control signal terminal.

17. A driving circuit, comprising:

an initialization circuit, configured to provide a signal of an initialization signal terminal to a gate of a driving transistor in response to a control signal;

a first control circuit, configured to input the control signal into the initialization circuit according to a signal of a first control terminal and a signal of a second control terminal;

a data writing circuit, configured to provide a signal of a data signal terminal to the driving transistor in response to a signal of a first scanning signal terminal;

the driving transistor, configured to generate a driving current according to the signal of the data signal terminal; and a light emitting device, configured to emit light under a control of the driving current;

wherein the first control circuit comprises: a first transistor; and a gate of the first transistor is electrically connected to the first control terminal, a first electrode of the first transistor is electrically connected to the second control terminal, and a second electrode of the first transistor is electrically connected to the initialization circuit;

wherein the driving circuit further comprises: a second control circuit, a third control circuit, and a fourth control circuit, wherein a first electrode of the driving transistor is electrically connected to a first power supply terminal through the third control circuit, and a second electrode of the driving transistor is electrically connected to the light emitting device through the fourth control circuit;

the second control circuit is configured to conduct the gate of the driving transistor with the second electrode of the driving transistor in response to a signal of a second scanning signal terminal;

the third control circuit is configured to conduct the first electrode of the driving transistor with the first power supply terminal in response to a signal of a first light emitting control signal terminal; and the fourth control circuit is configured to conduct the second electrode of the driving transistor with the light emitting device in response to a signal of a second light emitting control signal terminal;

wherein the second control terminal and a second light emitting control signal terminal are set as one signal terminal.

18. The driving circuit according to claim 17, wherein the second control circuit comprises: a second transistor; and a gate of the second transistor is electrically connected to the second scanning signal terminal, a first electrode of the second transistor is electrically connected to the gate of the driving transistor, and a second electrode of the second transistor is electrically connected to the second electrode of the driving transistor.

19. The driving circuit according to claim 17, wherein the third control circuit comprises:

a third transistor; and a gate of the third transistor is electrically connected to the first light emitting control signal terminal, a first electrode of the third transistor is electrically connected to the first power supply terminal, and a second electrode of the third transistor is electrically connected to the first electrode of the driving transistor.

20. The driving circuit according to claim 17, wherein the fourth control circuit comprises: a fourth transistor; and a gate of the fourth transistor is electrically connected to the second light emitting control signal terminal, a first electrode of the fourth transistor is electrically connected to the second electrode of the driving transistor, and a second electrode of the fourth transistor is electrically connected to the light emitting device.

* * * * *